July 25, 1967  E. E. HAGGARD, JR  3,333,072

RAIN RESPONSIVE CIRCUIT BREAKER

Filed May 13, 1965

INVENTOR
Eliot Eugene Haggard, Jr.

BY *Ehley & Ehley*

ATTORNEYS

United States Patent Office 3,333,072
Patented July 25, 1967

3,333,072
RAIN RESPONSIVE CIRCUIT BREAKER
Eliot E. Haggard, Jr., Duncanville, Tex., assignor to Telsco Industries, Dallas, Tex., a corporation of Texas
Filed May 13, 1965, Ser. No. 455,491
9 Claims. (Cl. 200—61.04)

This invention relates to new and useful improvements in rain responsive circuit breakers for controlling the operation of irrigation systems including sprinkler systems for lawns, gardens and orchards having electrically actuated pump and/or valve mechanisms.

The circuit breaker embodies a switch adapted to be connected in an irrigation system and means for actuating the switch including a movable receptacle exposed to the weather for collecting rain water whereby said switch is opened when the receptacle contains a predetermined quantity or weight of rain water so as to break said electrical control circuit and prevent operation of the irrigation system; said receptacle having an evaporative element or wick means projecting outwardly thereof to regulate evaporation of the collected rain water in accordance with weather conditions or at substantially the same rate as evaporation of moisture from the soil; the actuating means having an element movable into and out of engagement with said switch for opening and closing the same upon movement of said receptacle and being biased out of such engagement for resisting movement of said receptacle in response to the weight of its contained rain water; the element being adjustable so as to vary the quantity or weight of rain water required to impart movement to said receptacle.

A construction designed to carry out the invention will be hereinafter described together with other features of the invention.

Figure 1:
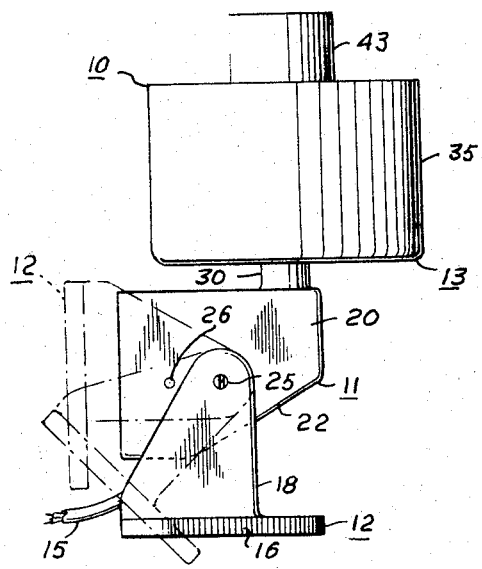
Figure 2:
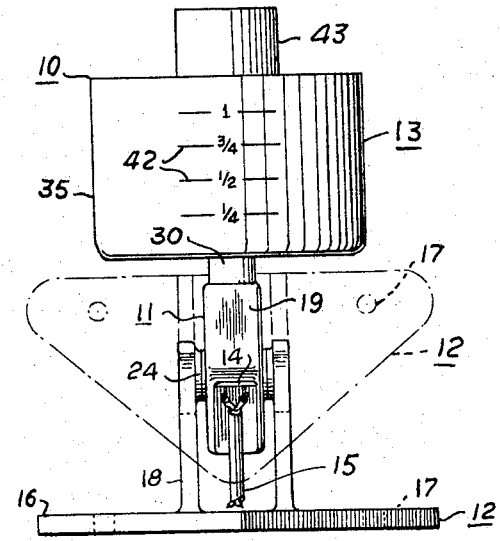
Figure 4:
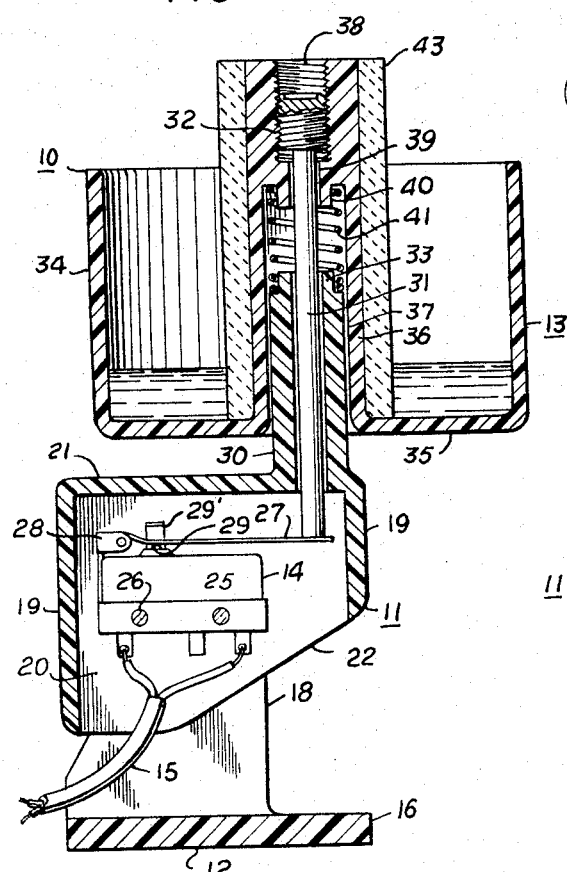
Figure 3:
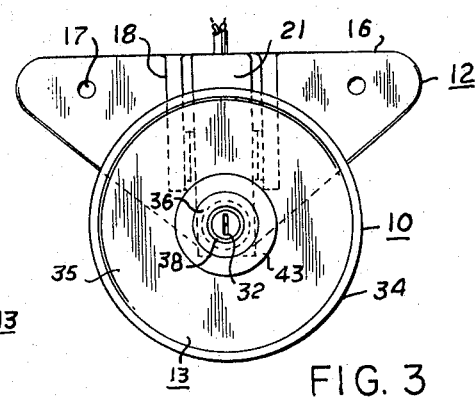
Figure 5:
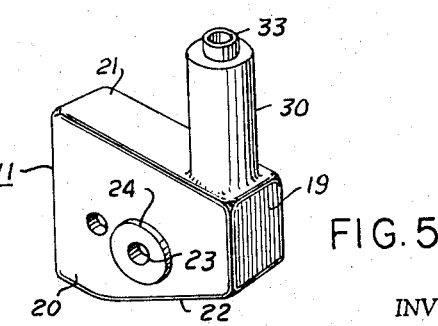

The invention will be more readily understood from a reading of the following specification and by reference to the accompanying drawing, wherein an example of the invention is shown, and wherein:

FIG. 1 is a side elevational view of a rain responsive circuit breaker constructed in accordance with the invention and showing an adjusted position of the supporting bracket in broken lines, FIG. 2 is a front elevational view similar to FIG. 1, FIG. 3 is a top plan view of the circuit breaker, FIG. 4 is an enlarged, transverse, vertical, sectional view of the circuit breaker, and FIG. 5 is a perspective view of the housing of the circuit breaker in which the switch is mounted and on which the rain collecting receptacle is mounted.

In the drawing, the numeral 10 designates a rain responsive circuit breaker embodying the principles of the invention and including a casing or housing 11 adapted to be pivotally supported by a bracket 12 and adapted to reciprocally support an annular, upwardly opening cup or receptacle 13 for collecting rain water to actuate a switch 14 mounted in the housing and arranged to be connected by a suitable lead 15 in the electrical control circuit (not shown) of an irrigation system (not shown). It is noted that the housing, bracket and receptacle may be formed entirely of suitable plastic material. The bracket 12 includes a substantially triangular base 16 having suitable mounting openings 17 and a pair of parallel, spaced arms or flanges 18 which extend perpendicularly from the base for supporting the housing 11 between their outer end portions.

The housing is of generally rectangular shape and has flat end, side and top walls 19, 20 and 21, with the parallel side walls 20 having upwardly inclined lower margins 22 at their outer portions whereby the front or outer end wall 19 is of less length than the parallel rear or inner end wall. Alined openings 23, encircled by external bosses 24, are formed in the side walls for receiving a screw 25 which extends through the outer end portions of the bracket arms 18 to pivotally support the housing 11 and permit angular adjustment of said housing relative to the bracket 12 (as shown in broken lines in FIG. 1) whereby said bracket may be mounted on a horizontal, vertical or other suitable surface while maintaining said housing in a vertical position.

As shown in FIG. 4, the screw 25 may extend through a portion of the switch 14 which is secured to the housing side walls 20 by one or more rivets 26. The switch may be of the normally-closed type having an actuating arm or lever 27 overlying and pivoted to its upper surface, as shown at 28, and normally out of engagement with the contact 29 of said switch to permit the flow of electrical current therethrough. An angular stop 29' may upstand from the switch 14 so as to overlie and confine the switch arm 29 in the usual manner. The housing 11 has a cylindrical extension or tube 30 upstanding from its top wall 21 for slidably supporting a cylindrical element or rod 31 in overlying relation to the outer end portion of the switch arm whereby said arm is pivoted downwardly to engage the contact 29 of the switch to break the electrical circuit when the rod is depressed into engagement with said arm. An enlarged, screwthreaded head 32 is provided at the upper end of the rod 31 to permit adjustment thereof relative to the switch arm 27.

As shown at 33 in FIGS. 4 and 5, the upper extremity of the tube 30 is of reduced diameter. The cup or receptacle 13 has a cylindrical side wall 34 and a flat bottom wall 35 from which an axial, tubular extension or member 36 upstands so as to project an appreciable distance above the side wall (FIG. 4). A cylindrical bore 37 extends throughout the lower and intermediate portions of the axial member 36 for slidably receiving the tube 30 to support the cup thereon, while a reduced, screwthreaded bore 38 is formed in the upper portion of said member for coacting with the screwthreaded head 32 of the rod 31 to permit vertical adjustment of the latter. Between the bores 37 and 38, a bore 39 is provided and may be substantially complementary to the rod to assist in maintaining the same in alinement with the bore of the tube 30. An annular boss or collar 40 depends from the bore 39 into the bore 37 for coacting with the reduced extremity 33 of the tube to confine the ends of a helical spring 41 which is disposed in said bore 37 so as to constantly urge the cup 13 upwardly. Since it is suspended from the axial member of the cup, the rod 31 is urged upwardly out of engagement with the switch arm 27 by the force of the spring until said cup is lowered by the weight of the rain water collected therein.

The cup 13 is adapted to contain approximately one inch of water and may have suitable indicia or other markings 42 thereon to visibily indicate the amount of controlled water, said cup being formed of translucent or substantially transparent material. Due to its screwthreaded head 32, the elevation of the rod 31 may be adjusted to vary the amount of collected water required to overcome the force of the spring 41 and depress said rod into engagement with the switch arm 27 for opening or breaking the electrical control circuit of the irrigation system. In most instances, it has been found preferable to adjust the rod so that it engages the switch arm when approximately one-quarter of an inch of water has been collected by the cup. The circuit breaker is adapted to be installed in any location that is exposed to the free fall of rain, such as the eave or edge of a roof, a pole or post, and that is out of the range of the sprinklers of the irrigation system as well as away from trees and other overhanging objects which might affect the accumulation of free falling rain by the cup.

An important feature of the invention is the provision of a wick 43 to regulate the evaporation of the rain water collected in the cup 13 in accordance with the weather conditions or at substantially the same rate as the evaporation of moisture from the soil. Ideally, the wick 43 is in the form of a tubular element or sleeve complementary to the axial member 36 of the cup for convenient mounting on said member. The wick may be formed of ceramic, felt, sponge or other suitable porous material capable of absorbing water from the bottom of the cup and conducting it by capillary attraction to the upper end portion of said wick. Since the axial member projects above the side wall 35 of the cup and the wick 43 is complementary to said member, the upper portion of said wick is exposed to the sun and wind and regulates the evaporation of the accumulated rain water at substantially the same rate as the evaporation of moisture from the soil.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A rain responsive circuit breaker for controlling the operation of an irrigation system including a housing, a switch mounted in the housing and adapted to be connected in the electrical control circuit of the irrigation system, the switch having a contact and a pivotally mounted arm for movment into and out of engagement mounted on said housing for collecting rain water, an upwardly opening receptacle overlying and reciprocally mounted on said housing for collecting rain water, an upright element carried by the receptacle for movement therewith and depending into said housing for engagement with the switch arm, and spring means interposed between said housing and receptacle for urging said receptacle upwardly and maintaining the element out of engagement with said switch arm whereby said switch remains closed until the weight of the rain water accumulated in said receptacle overcomes the force of the spring means to permit said element to engage said switch arm and open said switch.

2. A rain responsive circuit breaker as set forth in claim 1 including wick means extending from the bottom of the receptacle and projecting above said receptacle so that its upper portion is exposed for controlling evaporation of the accumulated rain water at substantially the same rate as evaporation of moisture from the soil.

3. A rain responsive circuit breaker as set forth in claim 1 including a bracket pivotally supporting the housing to permit angular adjustment of said housing relative to the bracket and vertical positioning of the receptacle irrespective of the position of said bracket.

4. A rain responsive circuit breaker as set forth in claim 1 wherein the housing and receptacle have telescoping upright tubular portions for reciprocally mounting the receptacle, the receptacle portion surrounding the housing portion and having the element suspended therefrom so as to extend through said housing portion into said housing, the spring means being confined in said receptacle portion above said housing portion in surrounding relation to said element.

5. A rain responsive circuit breaker for controlling the operation of an irrigation system including a housing, a switch mounted in the housing and adapted to be connected in the electrical control circuit of the irrigation system, the switch having a contact and a pivotally mounted arm for movement into and out of engagement with the contact to open and close said switch, a tubular extension upstanding from said housing above the switch arm, an upwardly opening receptacle for collecting rain water, an axial member upstanding from the bottom of the receptacle and having a bore complementary to the tubular extension of said housing for reciprocally mounting said receptacle on said extension, an upright element suspended from the upper portion of the member and depending through said extension into said housing for engagement with the switch arm, and a helical spring confined in the bore of said member between its upper portion and said extension in surrounding relation to the element for urging said receptacle upwardly and maintaining said element out of engagement with said switch arm whereby said switch remains closed until the weight of the rain water accumulated in said receptacle overcomes the force of the spring to permit said element to engage said switch arm and open said switch.

6. A rain responsive circuit breaker as set forth in claim 5 including wick means extending from the bottom of the receptacle and projecting above said receptacle so that its upper portion is exposed for controlling evaporation of the accumulated rain water at substantially the same rate as evaporation of moisture from the soil.

7. A rain responsive circuit breaker as set forth in claim 5 including a tubular element complementary to and surrounding the axial member of the receptacle so as to extend from the bottom of said receptacle and project thereabove, the tubular element being formed of porous material for absorbing and conducting accumulated rain water to its upper portion whereby the accumulated rain water evaporates at substantially the same rate as evaporation of moisture from the soil.

8. A rain responsive circuit breaker as set forth in claim 5 wherein the upright element is screwthreaded in the upper portion of the axial member of the receptacle to permit adjustment of its relative elevation for regulating the amount of rain water accumulated in said receptacle required to depress said upright element into engagement with the switch arm.

9. A rain responsive circuit breaker as set forth in claim 5 including a bracket pivotally supporting the housing to permit angular adjustment of said housing relative to the bracket and vertical positioning of the receptacle irrespective of the position of said bracket.

References Cited
UNITED STATES PATENTS

| | | | |
|---|---|---|---|
| 1,143,246 | 6/1915 | Barrash | 200—85 |
| 2,787,695 | 6/1954 | Dyke. | |
| 3,204,872 | 9/1965 | Whear | 200—61.06 |

BERNARD A. GILHEANY, *Primary Examiner.*

H. E. SPRINGBORN, *Assistant Examiner.*